(12) United States Patent
Liu et al.

(10) Patent No.: US 11,303,334 B2
(45) Date of Patent: Apr. 12, 2022

(54) COMMUNICATION METHOD AND RELATED DEVICE

(71) Applicant: Huawei Technologies Co., Ltd., Shenzhen (CN)

(72) Inventors: Danpu Liu, Beijing (CN); Hao Yan, Beijing (CN); Feng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/039,345

(22) Filed: Sep. 30, 2020

(65) Prior Publication Data

US 2021/0013939 A1   Jan. 14, 2021

Related U.S. Application Data

(63) Continuation of application No. PCT/CN2018/082227, filed on Apr. 8, 2018.

(51) Int. Cl.
*H04B 7/02* (2018.01)
*H04L 1/02* (2006.01)
*H04B 7/06* (2006.01)

(52) U.S. Cl.
CPC .................... *H04B 7/061* (2013.01)

(58) Field of Classification Search
CPC ........ H04B 7/061; H04B 7/0834; H04B 7/082
USPC ......................................................... 375/267
See application file for complete search history.

(56) References Cited

U.S. PATENT DOCUMENTS

| | | | |
|---|---|---|---|
| 2004/0127174 A1 | 7/2004 | Frank et al. | |
| 2008/0089269 A1* | 4/2008 | Tsutsui ................. | H04B 7/0689 370/316 |
| 2010/0315312 A1 | 12/2010 | Viorel et al. | |
| 2013/0072247 A1* | 3/2013 | Park ....................... | H04B 7/043 455/513 |
| 2014/0355707 A1* | 12/2014 | Kim ....................... | H04B 7/086 375/267 |
| 2016/0248451 A1* | 8/2016 | Weissman ......... | H04W 72/0453 |
| 2019/0149211 A1* | 5/2019 | Nilsson ................ | H04B 7/0695 375/267 |

FOREIGN PATENT DOCUMENTS

| | | |
|---|---|---|
| CN | 1503491 A | 6/2004 |
| CN | 201126857 Y | 10/2008 |
| CN | 101867401 A | 10/2010 |

\* cited by examiner

*Primary Examiner* — Tanmay K Shah
(74) *Attorney, Agent, or Firm* — Leydig, Voit & Mayer, Ltd.

(57) ABSTRACT

A communication method and a related device are described. A base station includes a plurality of antenna arrays and a baseband processing unit. The plurality of antenna arrays are distributed around a communication area and are all connected to the baseband processing unit. A terminal in the communication area is configured to perform signal transmission with the antenna arrays, to implement communication with the baseband processing unit. When an obstacle exists between the terminal and a primary antenna array performing signal transmission with the terminal, controlling, by the base station through the baseband processing unit, a secondary antenna array to perform signal transmission with the terminal.

17 Claims, 6 Drawing Sheets

COMMUNICATION METHOD AND RELATED DEVICE

CROSS-REFERENCE TO RELATED APPLICATIONS

This application is a continuation of International Application No. PCT/CN2018/082227, filed on Apr. 8, 2018, the disclosure of which is hereby incorporated by reference in its entirety.

TECHNICAL FIELD

This application relates to the field of communications technologies, and in particular, to a communication method and a related device.

BACKGROUND

Millimeter waves (mm-Wave) are radio waves whose wavelengths range from 1 mm to 10 mm and whose frequencies ranges from 30 GHz to 300 GHz. Because spectrum resources in millimeter-wave bands are abundant, application of millimeter waves to mobile communications becomes a hot research topic. However, because the millimeter waves have short wavelengths, and are easily blocked by an obstacle, for example, a building, a moving crowd, a hand holding a terminal, or a human body. This brings difficulty in application of millimeter waves to mobile communications. In addition, because the millimeter waves have high frequencies, a path loss during millimeter wave propagation is large, which also restricts millimeter wave communications. For a feature of a high path loss during millimeter wave propagation, a beamforming technology of an array antenna may be used to provide a beamforming gain, to compensate for the high path loss of the millimeter waves. However, when a problem of a high path loss of millimeter waves is resolved by using the beamforming technology, a problem that millimeter waves are easily blocked is aggravated. A reason is in the beamforming technology, a phased-array antenna is used to align a communication beam with a direction of a communication object, while compared with omnidirectional beam communication, directional beam communication is more easily blocked by an obstacle. Therefore, a person skilled in the art is studying how to perform effective communication by using the millimeter waves.

SUMMARY

Embodiments of this application disclose a communication method and a related device, to ensure smooth communication between a terminal and a base station.

According to a first aspect, an embodiment of this application provides a communication method, where the method is applied to a base station, the base station includes a plurality of antenna arrays and a baseband processing unit, the plurality of antenna arrays are distributed around a communication area and are all connected to the baseband processing unit, a terminal in the communication area is configured to perform signal transmission with the antenna array to implement communication with the baseband processing unit, and the method includes: when an obstacle exists between the terminal and a primary antenna array performing signal transmission with the terminal, controlling, by the base station through the baseband processing unit, a secondary antenna array to perform signal transmission with the terminal, where the primary antenna array and the secondary antenna array are in the antenna arrays included in the base station, and in the plurality of antenna arrays except the primary antenna array, the secondary antenna array is an antenna array with highest quality of signals between the antenna array and the terminal.

It can be learned that the plurality of antenna arrays of the base station are dispersedly distributed around the communication area (that is, are distributed antenna arrays). When an obstacle exists between the terminal and the primary antenna array in the plurality of antenna arrays, the terminal performs signal transmission with the secondary antenna array in the plurality of antenna arrays except the primary antenna array, to implement communication between the terminal and the base station, thereby effectively ensuring smooth communication between the terminal and the base station. In addition, correspondences between a plurality of reference locations and a plurality of antenna array groups are further established in advance. In this way, during subsequent switching between antenna arrays, switching between antenna arrays and between beams can be directly performed based on the correspondences, and the antenna arrays and the beams do not need to be retrained, thereby improving efficiency of antenna array and beam switching.

Optionally, before an obstacle appears between the primary antenna array and the terminal, in the plurality of antenna arrays, the primary antenna array is an antenna array closest to the terminal, or in the plurality of antenna arrays, the primary antenna array is an antenna array with highest quality of signals between the antenna array and the terminal.

Optionally, if the quality of signals between the primary antenna array and the terminal satisfies $|R_{p\ max} - R_{p0}| < \alpha_{th}$, an obstacle exists between the primary antenna array and the terminal, where $R_{p0}$ is the quality of signals between the primary antenna array and the terminal, $\alpha_{th}$ is a preset threshold, $R_{p\ max}$ is a maximum value of quality of signals between the plurality of antenna arrays and the terminal, and the primary antenna array is any one of the plurality of antenna arrays.

Optionally, the method further includes: receiving, by the base station, report information sent by the terminal, and determining a location of the terminal based on the report information; determining, by the base station based on the location of the terminal, a reference location closest to the location of the terminal; determining, by the base station based on pre-stored correspondences between a plurality of reference locations and a plurality of antenna array groups, an antenna array group corresponding to the reference location closest to the location of the terminal, where each antenna array group includes the primary antenna array and the secondary antenna array; and sending, by the base station, indication information to the terminal, to indicate the antenna array group corresponding to the reference location closest to the location of the terminal.

Optionally, the method further includes: receiving, by the base station, report information sent by the terminal, and determining a location of the terminal based on the report information; determining, by the base station based on the location of the terminal, a reference location closest to the location of the terminal; determining, by the base station based on pre-stored correspondences between a plurality of reference locations and a plurality of antenna array groups, an antenna array group corresponding to the reference location closest to the location of the terminal, where each antenna array group includes the primary antenna array and the secondary antenna array; and sending, by the base station, the correspondences between the plurality of reference locations and the plurality of antenna array groups to the terminal, where each antenna array group includes the primary antenna array and the secondary antenna array, and the correspondences are used by the terminal to determine the antenna array group corresponding to the reference location closest to the location of the terminal.

Optionally, the method further includes: determining, by the base station, quality of signals between the terminal at a target location in the communication area and each of the plurality of antenna arrays, where the target location is any one of the plurality of reference locations; selecting, by the base station, the antenna array group of the terminal at the target location based on the quality of signals between the terminal at the target location and each of the plurality of antenna arrays; and establishing, by the base station, a correspondence between the target location and the selected antenna array group, to obtain the correspondences between the plurality of reference locations and the plurality of antenna array groups.

Optionally, quality of signals between any antenna array and the terminal includes signal quality of an optimal beam pair between any antenna array and the terminal, and the optimal beam pair between any antenna array and the terminal is a pair of beams with best signal quality that are formed by a beam generated by any antenna array and a beam generated by the terminal.

According to a second aspect, an embodiment of this application provides a communication method. The method includes: when an obstacle exists between a terminal and a primary antenna array, performing, by the terminal, signal transmission with a secondary antenna array to implement communication with a base station, where the primary antenna array and the secondary antenna array are antenna arrays included in the base station; in a plurality of antenna arrays included in the base station except the primary antenna array, the secondary antenna array is an antenna array with highest quality of signals between the antenna array and the terminal; the plurality of antenna arrays are distributed around a communication area and all connected to a baseband processing unit of the base station; and the terminal is located in the communication area.

It can be learned that the plurality of antenna arrays of the base station are dispersedly distributed around the communication area (that is, are distributed antenna arrays). When an obstacle exists between the terminal and the primary antenna array in the plurality of antenna arrays, the terminal performs signal transmission with the secondary antenna array in the plurality of antenna arrays except the primary antenna array, to implement communication between the terminal and the base station, thereby effectively ensuring smooth communication between the terminal and the base station. In addition, correspondences between a plurality of reference locations and a plurality of antenna array groups are further established in advance. In this way, during subsequent switching between antenna arrays, switching between antenna arrays and between beams can be directly performed based on the correspondences, and the antenna arrays and the beams do not need to be retrained, thereby improving efficiency of antenna array and beam switching.

Optionally, before an obstacle appears between the primary antenna array and the terminal, in the plurality of antenna arrays, the primary antenna array is an antenna array closest to the terminal, or in the plurality of antenna arrays, the primary antenna array is an antenna array with highest quality of signals between the antenna array and the terminal.

Optionally, if quality of signals between the primary antenna array and the terminal satisfies $|R_{p\ max}-R_{p0}|<\alpha_{th}$, an obstacle exists between the primary antenna array and the terminal, where $R_{p0}$ is the quality of signals between the primary antenna array and the terminal, $\alpha_{th}$ is a preset threshold, $R_{p\ max}$ is a maximum value of quality of signals between the plurality of antenna arrays and the terminal, and the primary antenna array is any one of the plurality of antenna arrays.

Optionally, the method further includes: receiving, by the terminal, correspondences that are sent by the base station and that are between a plurality of reference locations and a plurality of antenna array groups, where each of the antenna array groups includes the primary antenna array and the secondary antenna array; determining, by the terminal based on a location of the terminal, a reference location closest to the location of the terminal; and determining, by the terminal based on the correspondences between the plurality of reference locations and the plurality of antenna array groups, an antenna array group corresponding to the reference location closest to the location the terminal.

Optionally, the method further includes: sending, by the terminal, report information to the base station to report a location of the terminal, so that the terminal determines, based on pre-stored correspondences between a plurality of reference locations and a plurality of antenna array groups, an antenna array group corresponding to a reference location closest to the location of the terminal, where each of the antenna array groups includes the primary antenna array and the secondary antenna array; receiving, by the terminal, indication information sent by the base station; and determining, by the terminal based on the indication information, the antenna array group corresponding to the reference location closest to the location of the terminal.

Optionally, quality of signals between any antenna array and the terminal includes signal quality of an optimal beam pair between any antenna array and the terminal, and the optimal beam pair between any antenna array and the terminal is a pair of beams with best signal quality that are formed by a beam generated by any antenna array and a beam generated by the terminal.

According to a third aspect, an embodiment of this application provides a base station, where the base station includes a plurality of antenna arrays and a baseband processing unit, the plurality of antenna arrays are distributed around a communication area and are all connected to the baseband processing unit, and a terminal in the communication area is configured to perform signal transmission with the antenna array to implement communication with the baseband processing unit; and the baseband processing unit is configured to: when an obstacle exists between the terminal and a primary antenna array performing signal transmission with the terminal, control a secondary antenna array to perform signal transmission with the terminal, where the primary antenna array and the secondary antenna array are in the antenna arrays included in the base station, and in the plurality of antenna arrays except the primary antenna array, the secondary antenna array is an antenna array with highest quality of signals between the antenna array and the terminal.

It can be learned that the plurality of antenna arrays of the base station are dispersedly distributed around the communication area (that is, are distributed antenna arrays). When an obstacle exists between the terminal and the primary antenna array in the plurality of antenna arrays, the terminal performs signal transmission with the secondary antenna array in the plurality of antenna arrays except the primary antenna array, to implement communication between the terminal and the base station, thereby effectively ensuring smooth communication between the terminal and the base station. In addition, correspondences between a plurality of reference locations and a plurality of antenna array groups are further established in advance. In this way, during subsequent switching between antenna arrays, switching between antenna arrays and between beams can be directly performed based on the correspondences, and the antenna arrays and the beams do not need to be retrained, thereby improving efficiency of antenna array and beam switching.

Optionally, before an obstacle appears between the primary antenna array and the terminal, in the plurality of antenna arrays, the primary antenna array is an antenna array closest to the terminal, or in the plurality of antenna arrays, the primary antenna array is an antenna array with highest quality of signals between the antenna array and the terminal.

Optionally, if quality of signals between the primary antenna array and the terminal satisfies $|R_{p\,max} - R_{p0}| < \alpha_{th}$, an obstacle exists between the primary antenna array and the terminal, where $R_{p0}$ is the quality of signals between the primary antenna array and the terminal, $\alpha_{th}$ is a preset threshold, $R_{p\,max}$ is a maximum value of quality of signals between the plurality of antenna arrays and the terminal, and the primary antenna array is any one of the plurality of antenna arrays.

Optionally, the baseband processor is further configured to: receive report information sent by the terminal, and determine a location of the terminal based on the report information; determine, based on the location of the terminal, a reference location closest to the location of the terminal; determine, based on pre-stored correspondences between a plurality of reference locations and a plurality of antenna array groups, an antenna array group corresponding to the reference location closest to the location of the terminal, where each antenna array group includes the primary antenna array and the secondary antenna array; and send indication information to the terminal, to indicate the antenna array group corresponding to the reference location closest to the location of the terminal.

Optionally, the baseband processor is further configured to: receive report information sent by the terminal, and determine a location of the terminal based on the report information; determine, based on the location of the terminal, a reference location closest to the location of the terminal; determine, based on pre-stored correspondences between a plurality of reference locations and a plurality of antenna array groups, an antenna array group corresponding to the reference location closest to the location of the terminal, where each antenna array group includes the primary antenna array and the secondary antenna array; and send the correspondences between the plurality of reference locations and the plurality of antenna array groups to the terminal, where each antenna array group includes the primary antenna array and the secondary antenna array, and the correspondences are used by the terminal to determine the antenna array group corresponding to the reference location closest to the location of the terminal.

Optionally, the baseband processing unit is further configured to: determine quality of signals between the terminal at a target location in the communication area and each of the plurality of antenna arrays, where the target location is any one of the plurality of reference locations; select the antenna array group of the terminal at the target location based on the quality of signals between the terminal at the target location and each of the plurality of antenna arrays; and establish a correspondence between the target location and the selected antenna array group, to obtain the correspondences between the plurality of reference locations and the plurality of antenna array groups.

Optionally, quality of signals between any antenna array and the terminal includes signal quality of an optimal beam pair between any antenna array and the terminal, and the optimal beam pair between any antenna array and the terminal is a pair of beams with best signal quality that are formed by a beam generated by any antenna array and a beam generated by the terminal.

According to a fourth aspect, an embodiment of this application provides a terminal, where the terminal is configured to: when an obstacle exists between the terminal and a primary antenna array, perform signal transmission with a secondary antenna array to implement communication with a base station, where the primary antenna array and the secondary antenna array are antenna arrays included in the base station; in a plurality of antenna arrays included in the base station except the primary antenna array, the secondary antenna array is an antenna array with highest quality of signals between the antenna array and the terminal; the plurality of antenna arrays are distributed around a communication area and all connected to a baseband processing unit of the base station; and the terminal is located in the communication area.

It can be learned that the plurality of antenna arrays of the base station are dispersedly distributed around the communication area (that is, are distributed antenna arrays). When an obstacle exists between the terminal and the primary antenna array in the plurality of antenna arrays, the terminal performs signal transmission with the secondary antenna array in the plurality of antenna arrays except the primary antenna array, to implement communication between the terminal and the base station, thereby effectively ensuring smooth communication between the terminal and the base station. In addition, correspondences between a plurality of reference locations and a plurality of antenna array groups are further established in advance. In this way, during subsequent switching between antenna arrays, switching between antenna arrays and between beams can be directly performed based on the correspondences, and the antenna arrays and the beams do not need to be retrained, thereby improving efficiency of antenna array and beam switching.

Optionally, before an obstacle appears between the primary antenna array and the terminal, in the plurality of antenna arrays, the primary antenna array is an antenna array closest to the terminal, or in the plurality of antenna arrays, the primary antenna array is an antenna array with highest quality of signals between the antenna array and the terminal.

Optionally, if quality of signals between the primary antenna array and the terminal satisfies $|R_{p\,max} - R_{p0}| < \alpha_{th}$, an obstacle exists between the primary antenna array and the terminal, where $R_{p0}$ is the quality of signals between the primary antenna array and the terminal, $\alpha_{th}$ is a preset threshold, $R_{p\,max}$ is a maximum value of quality of signals between the plurality of antenna arrays and the terminal, and the primary antenna array is any one of the plurality of antenna arrays.

Optionally, the terminal is further configured to receive correspondences that are sent by the base station and that are between a plurality of reference locations and a plurality of antenna array groups, where each of the antenna array groups includes the primary antenna array and the secondary antenna array; the terminal is further configured to determine, based on a location of the terminal, a reference location closest to the location of the terminal; and the terminal is further configured to determine, based on the correspondences between the plurality of reference locations and the plurality of antenna array groups, an antenna array group corresponding to the reference location closest to the location the terminal.

Optionally, the terminal is further configured to send report information to the base station to report a location of the terminal, so that the terminal determines, based on pre-stored correspondences between a plurality of reference locations and a plurality of antenna array groups, an antenna array group corresponding to a reference location closest to the location of the terminal, where each of the antenna array groups includes the primary antenna array and the secondary antenna array; the terminal is further configured to receive indication information sent by the base station; and the terminal is further configured to determine, based on the indication information, the antenna array group corresponding to the reference location closest to the location of the terminal.

Optionally, quality of signals between any antenna array and the terminal includes signal quality of an optimal beam pair between any antenna array and the terminal, and the optimal beam pair between any antenna array and the terminal is a pair of beams with best signal quality that are formed by a beam generated by any antenna array and a beam generated by the terminal.

According to a fifth aspect, an embodiment of this application provides a base station, where the base station includes units configured to perform the method in the first aspect.

According to a sixth aspect, an embodiment of this application provides a terminal, where the terminal includes units configured to perform the method in the second aspect.

According to a seventh aspect, an embodiment of this application provides a computer-readable storage medium, where the computer-readable storage medium stores a program instruction, and when the program instruction is run on a processor, the method in the first aspect or the second aspect is implemented.

According to an eighth aspect, an embodiment of this application provides a program product, where when the program product runs on a processor, the method in the first aspect or the second aspect is implemented.

According to a ninth aspect, an embodiment of this application provides a chip system, where the chip system includes at least one processor, a memory, and an interface circuit. The memory, the interface circuit, and the at least one processor are interconnected by using a line. The at least one memory stores an instruction, and when the instruction is executed by the processor, the method in the first aspect or the second aspect is implemented.

Through implementation of the embodiments of this application, the plurality of antenna arrays of the base station are dispersedly distributed around the communication area (that is, are distributed antenna arrays). When an obstacle exists between the terminal and the primary antenna array in the plurality of antenna arrays, the terminal performs signal transmission with the secondary antenna array in the plurality of antenna arrays except the primary antenna array, to implement communication between the terminal and the base station, thereby effectively ensuring smooth communication between the terminal and the base station. In addition, correspondences between a plurality of reference locations and a plurality of antenna array groups are further established in advance. In this way, during subsequent switching between antenna arrays, switching between antenna arrays and between beams can be directly performed based on the correspondences, and the antenna arrays and the beams do not need to be retrained, thereby improving efficiency of antenna array and beam switching.

DESCRIPTION OF EMBODIMENTS

The following describes embodiments of this application with reference to the accompanying drawings in the embodiments of this application.

Figure 1:
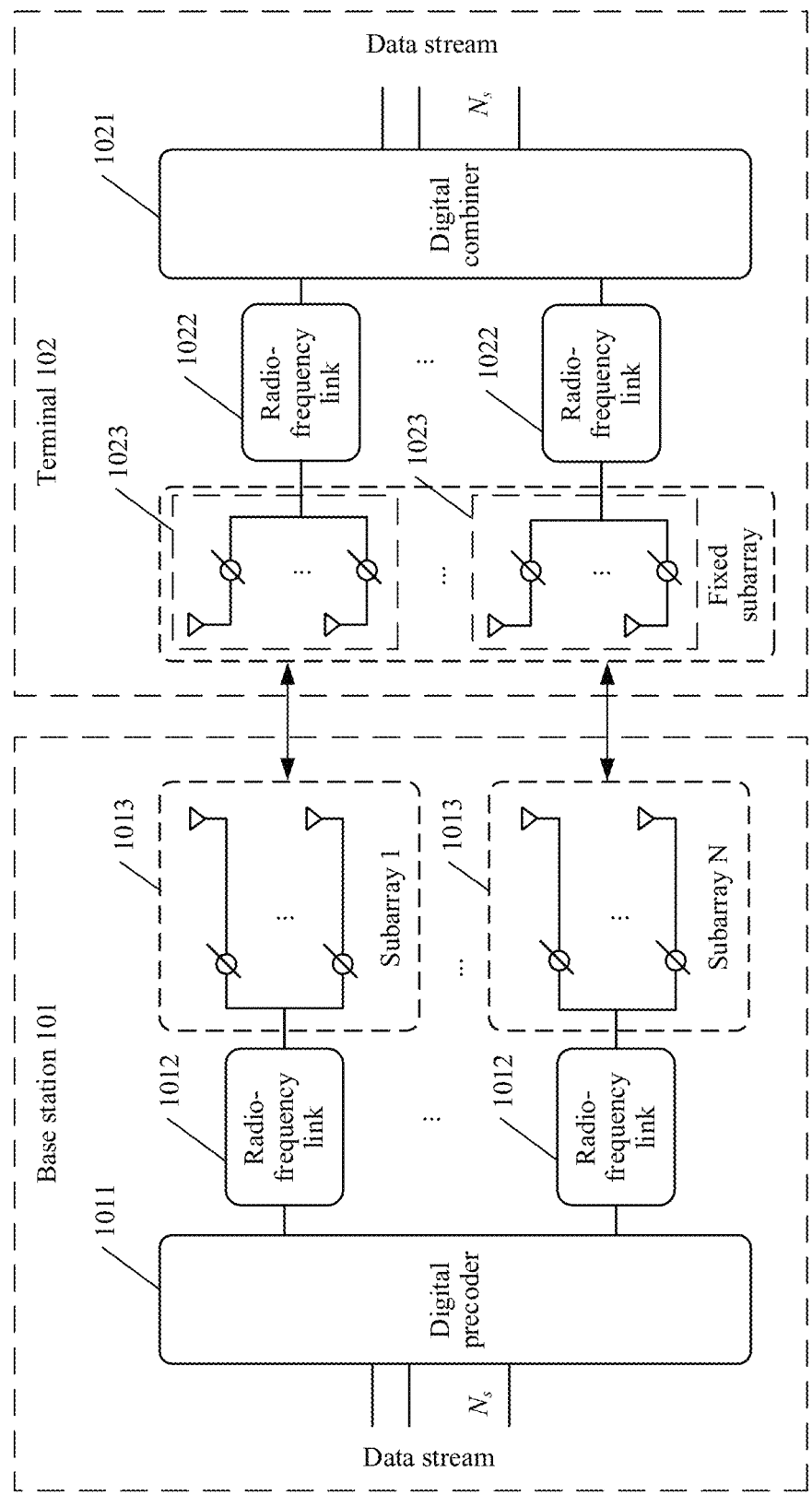
FIG. 1 is a schematic architectural diagram of a communications system according to an embodiment of this application.

FIG. 1 is a schematic architectural diagram of a communications system 10 according to an embodiment of this application. The communications system includes a base station 101 and a terminal 102. The base station 101 includes a baseband processing unit, a plurality of radio-frequency links 1012, and a radio frequency unit. The baseband processing unit may include a digital precoder 1011. The radio frequency unit includes a plurality of antenna arrays 1013. The digital precoder 1011 is connected to the plurality of antenna arrays 1013 through the plurality of radio-frequency links 1012 respectively. The digital precoder 1011 is configured to send a plurality of data streams to the plurality of antenna arrays 1013 over the plurality of radio-frequency links 1012 respectively. In addition, the terminal 102 includes a baseband processing unit, a plurality of radio-frequency links 1022, and a radio frequency unit. The baseband processing unit may include a digital combiner 1021. The radio frequency unit includes a plurality of antenna arrays 1023. The digital combiner 1021 is connected to the plurality of antenna arrays 1023 through the plurality of radio-frequency links 1022 respectively. The digital combiner 1021 is configured to receive data streams from the plurality of antenna arrays 1023 over the plurality of radio-frequency links 1022, and restore the data streams.

In this embodiment of this application, a quantity of the antenna arrays of the base station 101 may be the same as or different from a quantity of the antenna arrays of the terminal 102. The antenna arrays of the base station 101 are dispersedly distributed around a communication area, while the antenna arrays of the terminal 102 are centrally distributed. That "the plurality of antenna arrays of the base station are distributed around a communication area" means that at least two antenna arrays are distributed around the communication area; in addition, a scenario in which a small part of the antenna arrays are distributed near the middle of the communication area is not excluded. The communication area may be a spatial area planned, for example, an indoor area, or for another example, a specified outdoor area. The terminal 102 is configured to communicate with the base station 101 in the communication area. To be specific, the terminal is configured to perform signal transmission with the antenna arrays of the base station, to implement communication with the baseband processing unit. It should be noted that the plurality of antenna arrays of the base station include one primary antenna array and a plurality of secondary antenna arrays. The terminal performs signal transmission with the primary antenna array of the base station. The secondary antenna arrays of the base station are used as standby antenna arrays.

In addition, a terminal in the embodiments of this application may include a handheld device (for example, a mobile phone, a tablet computer, or a palmtop computer) having a wireless communication function, an vehicle-mounted device (for example, a device mounted on a car, a bicycle, an electric vehicle, an airplane, or a ship), a wearable device (for example, a smartwatch (such as an iWatch), a smart band, or a pedometer), a smart household device (for example, a refrigerator, a television, an air conditioner, or an electricity meter), a smart robot, a workshop device, another processing device that can connect to a wireless modem, various forms of user equipments (UE), mobile stations (MS), terminals, terminal equipments, or the like. Optionally, in this application, a base station communicates with a terminal by using millimeter waves.

Figure 2:
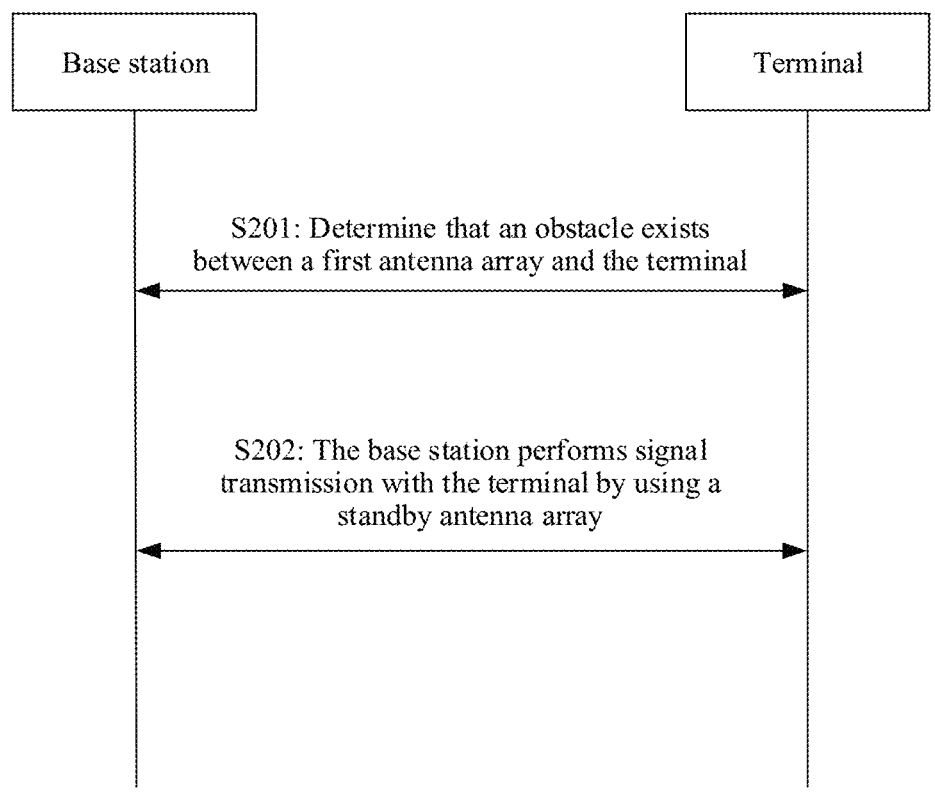
FIG. 2 is a schematic flowchart of a communication method according to an embodiment of this application.

FIG. 2 shows a communication method according to an embodiment of this application. The method may be implemented based on the architecture shown in FIG. 1. The method includes but is not limited to the following steps.

Step S201: A base station and a terminal determine that an obstacle exists between a first antenna array and the terminal.

Specifically, the first antenna array is a primary antenna array for signal transmission between the base station and the terminal. Before an obstacle appears between the primary antenna array and the terminal, in a plurality of antenna arrays, the primary antenna array is an antenna array closest to the terminal, or in a plurality of antenna arrays, the primary antenna array is an antenna array with highest quality of signals between the antenna array and the terminal. In addition, the base station and the terminal may separately determine whether an obstacle exists between the first antenna array and the terminal. For example, the determining is performed based on quality of signals between the first antenna array and the terminal. When the signal quality is worse than a preset threshold, it indicates that an obstacle exists between the first antenna array and the terminal. For example, if the quality of signals between the primary antenna array and the terminal satisfies $|R_{p\ max} - R_{p0}| < \alpha_{th}$, an obstacle exists between the primary antenna array and the terminal, where $R_{p0}$ is the quality of signals between the primary antenna array and the terminal, $\alpha_{th}$ is the preset threshold, $R_{p\ max}$ is a maximum value of quality of signals between the plurality of antenna arrays and the terminal, and the primary antenna array is any one of the plurality of antenna arrays. In addition, if the base station and the terminal can still communicate with each other, one of the base station and the terminal may notify the other one after determining that an obstacle exists.

It should be noted that, quality of signals between any antenna array and the terminal is signal quality of an optimal beam pair between any antenna array and the terminal, and the optimal beam pair between any antenna array and the terminal is a pair of beams with best signal quality that are formed by a beam generated by any antenna array and a beam generated by the terminal.

Step S202: The base station performs signal transmission with the terminal by using a standby antenna array.

Specifically, in the plurality of antenna arrays included in the base station except the primary antenna array, the secondary antenna array is an antenna array with highest quality of signals between the antenna array and the terminal. It may be understood that, because the plurality of antenna arrays are dispersedly distributed around a communication area, the obstacle between the first antenna array and the terminal usually does not block signals between the terminal and another antenna array. Therefore, in this application, the standby antenna array other than the first antenna array is selected to perform signal transmission with the terminal, so that communication between the terminal and the base station can be effectively supported.

Optionally, the base station pre-stores correspondences between a plurality of reference locations and a plurality of antenna array groups. The plurality of reference locations are different locations in the communication area, each reference location corresponds to one antenna array group, and each antenna array group corresponding to a reference location includes one primary antenna array and a plurality of secondary antenna arrays. For a reference location, a primary antenna array corresponding to the reference location is an antenna array that is in the plurality of antenna arrays and that is closest to the reference location, or is an antenna array that is in the plurality of antenna arrays and that has highest quality of signals between the antenna array and a terminal at the reference location. Priorities of a plurality of secondary antenna arrays corresponding to the reference location may be set in descending order of quality of signals between the secondary antenna arrays and the terminal at the reference location. When a primary antenna array corresponding to the reference location is unavailable (for example, an obstacle exists between the primary antenna array and the terminal at the reference location), the primary antenna array is replaced with a secondary antenna array that corresponds to the reference location and that has a higher priority, to perform signal transmission with the terminal at the reference location. If the secondary antenna array having a higher priority is also unavailable, a secondary antenna array having a lower priority is selected to perform signal transmission with the terminal at the reference location.

It should be noted that the correspondences between the plurality of reference locations and the plurality of antenna array groups may be obtained by the base station by performing signal transmission training in advance with terminals at the plurality of reference locations. For example, the base station determines quality of signals between the terminal at a target location in the communication area and each of the plurality of antenna arrays, where the target location is any one of the plurality of reference locations; the base station selects the antenna array group of the terminal at the target location based on the quality of signals between the terminal at the target location and each of the plurality of antenna arrays; and the base station establishes a correspondence between the target location and the selected antenna array group, to obtain the correspondences between the plurality of reference locations and the plurality of antenna array groups.

Subsequently, when a terminal needs to communicate with the base station, both the base station and the terminal need to learn of a corresponding antenna array group. Two optional manners are provided below.

Manner A: First, the base station receives report information sent by the terminal, and determines a location of the terminal based on the report information; the base station determines, based on the location of the terminal, a reference location closest to the location of the terminal; the base station determines, based on pre-stored correspondences between a plurality of reference locations and a plurality of antenna array groups, an antenna array group corresponding to the reference location closest to the location of the terminal, where each antenna array group includes the primary antenna array and the secondary antenna array; and finally, the base station sends indication information to the terminal, to indicate the antenna array group corresponding to the reference location closest to the location of the terminal. Next, the terminal may perform signal transmission with the base station based on the primary antenna array in the determined antenna array group, and perform signal transmission with the base station by using the secondary antenna array in the antenna array group when an obstacle exists between the terminal and the primary antenna array (that is, the operation in step S102).

Manner B: First, the base station receives report information sent by the terminal, and determines a location of the terminal based on the report information; the base station determines, based on the location of the terminal, a reference location closest to the location of the terminal; the base station determines, based on pre-stored correspondences between a plurality of reference locations and a plurality of antenna array groups, an antenna array group corresponding to the reference location closest to the location of the terminal, where each antenna array group includes the primary antenna array and the secondary antenna array; and finally, the base station sends the correspondences between the plurality of reference locations and the plurality of antenna array groups to the terminal, where each antenna array group includes the primary antenna array and the secondary antenna array, and the correspondences are used by the terminal to determine the antenna array group corresponding to the reference location closest to the location of the terminal. Next, the terminal may perform signal transmission with the base station based on the primary antenna array in the determined antenna array group, and perform signal transmission with the base station by using the secondary antenna array in the antenna array group when an obstacle exists between the terminal and the primary antenna array (that is, the operation in step S102).

In addition, if the terminal is moving, after the antenna array group is determined for the terminal, the antenna array group may temporarily not be switched to an antenna array group to be used by the terminal. Instead, a time when the terminal arrives at the closest reference location is estimated based on a moving speed of the terminal, and the determined antenna array group is switched to the antenna array group to be used by the terminal, only after it is estimated that the terminal reaches the closest reference location. Both the terminal and the base station perform switching operations.

The idea of the embodiments of this application is described above in detail, and the following describes the embodiments of this application with reference to specific examples.

It is assumed that a quantity of antenna arrays in a base station is P, sequence numbers of the P antenna arrays are 1, 2, 3, 4, . . . , and P, and a quantity of beams generated by each antenna array is N. In this case, beams of an antenna array whose sequence number is p in the P antenna arrays may be represented by using a beam set $B_p = \{b_{p1}, b_{p2}, \ldots, b_{pN}\}$. Assuming that a quantity of beams generated by an antenna array of the terminal is M, the beams generated by the antenna array of the terminal may be represented by using a beam set $B_U = \{b_{U1}, b_{U1}, \ldots, b_{UM}\}$.

1. In a system deployment stage, the terminal traverses reference locations that the terminal may reach in a communication area. Every time a reference location is reached, the terminal performs beam training between the reference location and the plurality of antenna arrays of the base station; and determines, based on a distance between the reference location and each antenna array and based on quality of signals between the reference location and each antenna array, a primary antenna array and a secondary antenna array that correspond to the reference location, an optimal beam pair between the terminal and the primary antenna array, and an optimal beam pair between the terminal and the secondary antenna array. For ease of understanding, the following first uses one reference location in the plurality of reference locations as an example for description, and the reference location may be referred to as a target reference location.

Step 1: The terminal performs beam searching based on the beam set $B_U$, where a sending period of each beam in $B_U$ is T.

Figure 3:
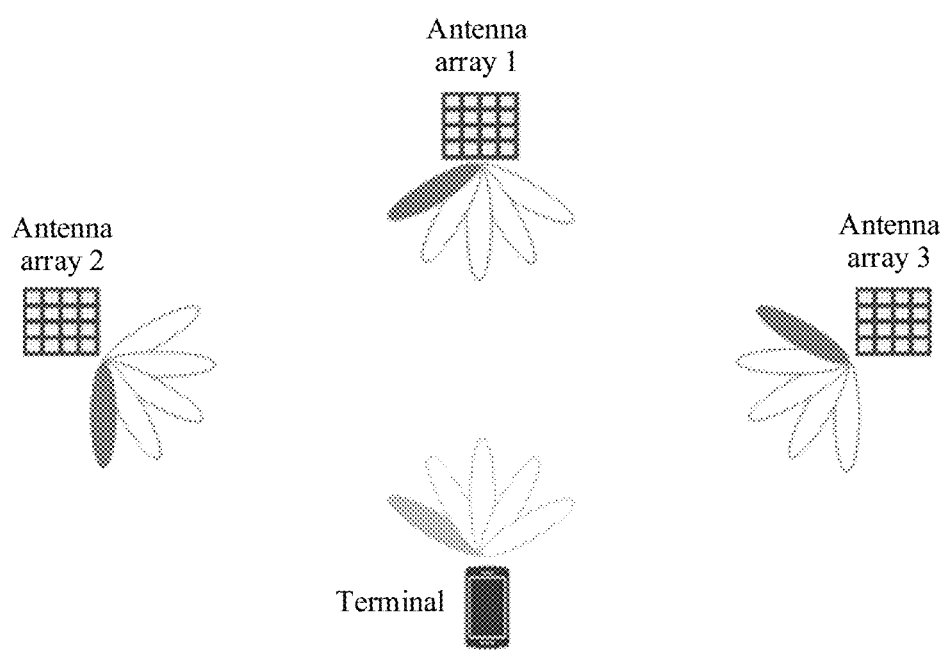
FIG. 3 is a schematic diagram of a scenario of beam training according to an embodiment of this application.

Step 2: The base station measures reference signal received power (Reference Signal Receiving Power, RSRP) of each subarray. For example, in the sending period T of each beam $b_{Um}$ (m may be 1, 2, . . . , or M) of the terminal, the base station performs beam searching on all the antenna arrays based on the beam set $B_p$, and finds a pair of receive and transmit beams that have largest RSRP and that are between each antenna array and a beam generated by the terminal, to obtain a measurement result $(p, n_p, m_p, Rp_p)$. A meaning of the measurement result $(p, n_p, m_p, Rp_p)$ is as follows: A beam whose beam sequence number is n and that is generated by the antenna array whose array sequence number is p and a beam whose beam sequence number is m and that is generated by an antenna array of the terminal form an optimal beam pair between the antenna array whose array sequence number is p and the terminal, and communication signal quality of the optimal beam pair is Rp. FIG. 3 is a schematic diagram of a beam training scenario, and specifically shows beam training performed between three antenna arrays (an antenna array 1, an antenna array 2, and an antenna array 3) of the base station and the antenna array of the terminal.

Step 3: A candidate beam set can be obtained by making p in the foregoing measurement result $(p, n_p, m_p, Rp_p)$ be 1 to N sequentially:

$$B_{CS} = \{(1, n_1, m_1, Rp_1), (2, n_2, m_2, Rp_2), (3, n_3, m_3, Rp_3), \ldots (P, n_P, p_P, Rp_P)\}$$

Step 4: Determine an antenna array that is in the plurality of antenna arrays of the base station and that is closest to the target reference location at which the terminal is currently located, where if an array sequence number p* of the closest antenna array is determined, a measurement result $(p^*, n_{p^*}, m_{p^*}, Rp_{p^*})$ corresponding to the array sequence number p* may be found from the candidate beam set; and determine a target antenna array in the plurality of antenna arrays of the base station. If a measurement result corresponding to an antenna array has best signal quality Rp compared with all the other measurement results included in the candidate beam set, the antenna array is the target antenna array; and if an array sequence number of the target antenna array is v, a measurement result corresponding to the array sequence number v may be represented as $(v, n_v, m_v, R_N)$.

Step 5: If $|Rp_v-Rp_{p*}|<\alpha_{th}$ is satisfied, determine an antenna array whose array sequence number is p* as a primary antenna array corresponding to the target reference location of the terminal. In addition, when the terminal at the target reference location performs signal transmission with the antenna array whose array sequence number is p*, a sequence number of a beam used by the antenna array whose array sequence number is p* is $n_{p*}$, and a sequence number of a beam used by the terminal is $m_{p*}$. It should be noted that $\alpha_{th}$ is a preset threshold. In addition, the first X (X is a preset value, for example, X may be equal to 1 or 2) measurement results except $(p*, n_{p*}, m_{p*}, Rp_{p*})$ in the candidate beam set $B_{CS}$ are selected in descending order of signal quality Rp. Antenna arrays corresponding to the first X measurement results are used as secondary antenna arrays corresponding to the terminal at the target reference location. If the terminal needs to perform signal transmission at the target reference location with a secondary antenna array whose array sequence number is y, a sequence number of a beam used by the secondary antenna array whose array sequence number is y is $n_y$ in the measurement result $(y, n_y, m_y, Rp_y)$, and a sequence number of a beam used by the terminal is $m_y$ in the measurement result $(y, n_y, m_y, Rp_y)$.

If $|Rp_v-Rp_{p*}|<\alpha_{th}$ is not satisfied, it indicates that an obstacle exists between the antenna array whose array sequence number is p* and the terminal. In this case, an antenna array whose array sequence number is v is determined as a primary antenna array corresponding to the target reference location of the terminal. When the terminal performs signal transmission at the target reference location with the antenna array whose array sequence number is v, a sequence number of a beam used by the antenna array whose array sequence number is v is $n_v$, and a sequence number of a beam used by the terminal is $m_v$. In addition, the first X measurement results except $(v, n_v, m_v, Rp_v)$ in the candidate beam set $B_{CS}$ are selected in descending order of signal quality Rp. Antenna arrays corresponding to the first X measurement results are used as secondary antenna arrays corresponding to the terminal at the target reference location. If the terminal needs to perform signal transmission at the target reference location with a secondary antenna array whose array sequence number is y, a sequence number of a beam used by the secondary antenna array whose array sequence number is y is $n_y$ in the measurement result $(y, n_y, m_y, Rp_y)$, and a sequence number of a beam used by the terminal is $m_y$ in the measurement result $(y, n_y, m_y, Rp_y)$. Such a manner of determining the primary antenna array and the secondary antenna arrays corresponding to the target reference location may be referred to as a "distance-first criterion" for short.

The foregoing describes how to determine the primary antenna array and the secondary antenna arrays corresponding to the target reference location, and the corresponding optimal beam pair. The same method may be used to determine a primary antenna array and a secondary antenna array corresponding to another target reference location in the plurality of reference locations, and a corresponding optimal beam pair. That is, correspondences between the plurality of reference locations and the plurality of antenna array groups (each including a primary antenna array and a secondary antenna array) may be determined according to the foregoing principle.

Table 1 lists examples of optional correspondences. Details are as follows:

TABLE 1

| Reference location | Primary antenna array | Secondary antenna array 1 | . . . | Secondary antenna array K |
|---|---|---|---|---|
| (1, 1) | (1, 1, 3) | (2, 4, 7) | . . . | (5, 3, 9) |
| (1, 2) | (1, 2, 3) | (3, 1, 8) | . . . | (4, 6, 3) |
| . . . | . . . | . . . | . . . | . . . |
| (2, 2) | (3, 2, 4) | (5, 7, 1) | . . . | (2, 5, 3) |

In Table 1, the plurality of reference locations are respectively represented by location coordinates (1, 1), (1, 2), . . . , and (2, 2). In addition, each antenna array (including a primary antenna array and a secondary antenna array) is represented by three-dimensional coordinates (a, b, c), where the first value a represents an array sequence number of an antenna array, the second value b represents a sequence number of a beam used by the antenna array whose array sequence number is a, and the third value c represents a sequence number of a beam used by the terminal. Parameters in the first row are used as an example. The parameters in the first row indicate that a primary antenna array corresponding to a reference location (1, 1) is the antenna array whose array sequence number is 1, a beam whose sequence number is 1 is used when the antenna array whose array sequence number is 1 performs signal transmission with a terminal at the reference location (1, 1), and a beam whose sequence number is 3 is used when the terminal at the reference location (1, 1) performs signal transmission with the antenna array whose array sequence number is 1. In addition, a secondary antenna array corresponding to a reference location is an antenna array identified by a sequence number such as 2 or 5. A secondary antenna array whose array sequence number is 2 is used as an example. A beam whose sequence number is 4 is used when the secondary antenna array whose array sequence number is 2 performs signal transmission with the terminal at the reference location (1, 1), and a beam whose sequence number is 7 is used when the terminal at the reference location (1, 1) performs signal transmission with the secondary antenna array whose array sequence number is 2. The rest may be deduced by analogy, and details are not described herein again.

2. In a real-time communication phase, a reference location of the terminal or a reference location close to the terminal is determined based on an actual location of the terminal, and then a primary antenna array and a secondary antenna array that correspond to the reference location are determined based on the foregoing correspondences. The determined primary antenna array and the terminal perform signal transmission by using a trained optimal beam pair between the determined primary antenna array and the terminal. If an obstacle appears between the terminal and the corresponding primary antenna array, the determined secondary antenna array and the terminal perform signal transmission by using a trained optimal beam pair between the determined secondary antenna array and the terminal. If the location of the terminal changes, the following manner may be used to perform antenna array switching.

Method 1: Based on a current movement direction, a speed, and a location of the terminal, the terminal calculates a time at which the terminal arrives at a next reference location (or a location relatively close to a next reference location), and reports current location information of the terminal and the calculated time to the base station. Afterwards, both the terminal and the base station perform antenna array switching and beam switching at the time, so that the base station and the terminal perform signal transmission based on a primary antenna array and a secondary antenna array that correspond to the next reference location and based on a corresponding optimal beam.

Manner 2: The terminal sends information about a current movement direction, a speed, and a location of the terminal to the base station. The base station calculates, based on the information, a time at which the terminal arrives at a next reference location (or a location relatively close to a next reference location), and then, the base station sends, to the terminal, the calculated time, information about a primary antenna array and a secondary antenna array that correspond to the next reference location, and information about a corresponding optimal beam. Afterwards, both the terminal and the base station perform antenna array switching and beam switching at the time, so that the base station and the terminal perform signal transmission based on the primary antenna array and the secondary antenna array that correspond to the next reference location and based on the corresponding optimal beam.

The following provides a simulation effect of an industrial robot (which is a terminal) moving in a factory (which is a communication area).

Figure 4:
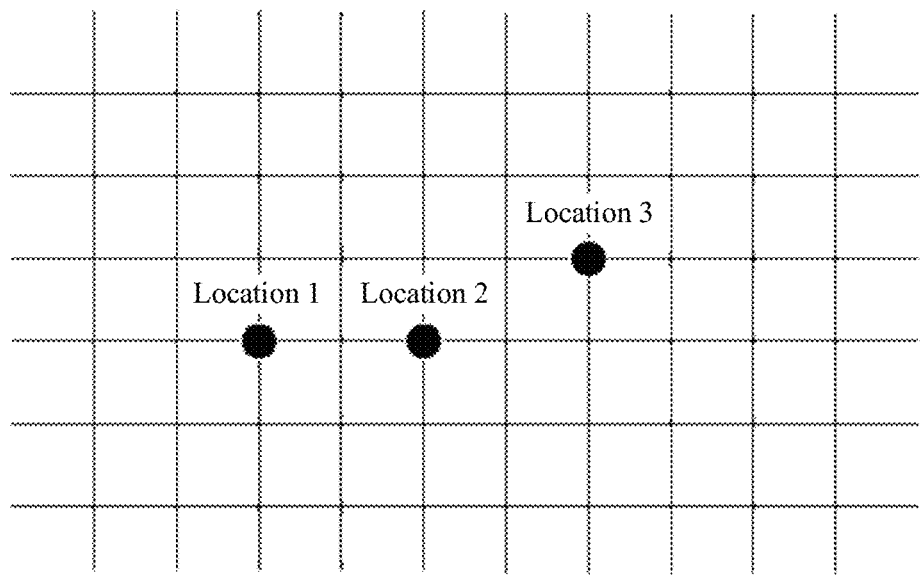
FIG. 4 is a schematic diagram of a plurality of reference locations according to an embodiment of this application.

Simulation premise 1: The industrial robot moves on the ground of the factory along crossed straight lines of a grid shown in FIG. 4.

Simulation premise 2: Settings of parameters related to the simulation are shown in Table 2.

TABLE 2

| Parameter | Setting |
| --- | --- |
| Factory building scale | 100 m*50 m*4 m |
| Quantity of reference locations | 99*49 = 4851 |
| Antenna configuration | 64*16 |
| Quantity of antenna arrays of a base station | 5 |
| Rician factor (Rician factor) | K = 10 dB |
| Carrier center frequency | 60 GHz |
| Channel model | Corrected SV channel model |
| Threshold $\alpha_{th}$ | 3 dB |

Figure 5:
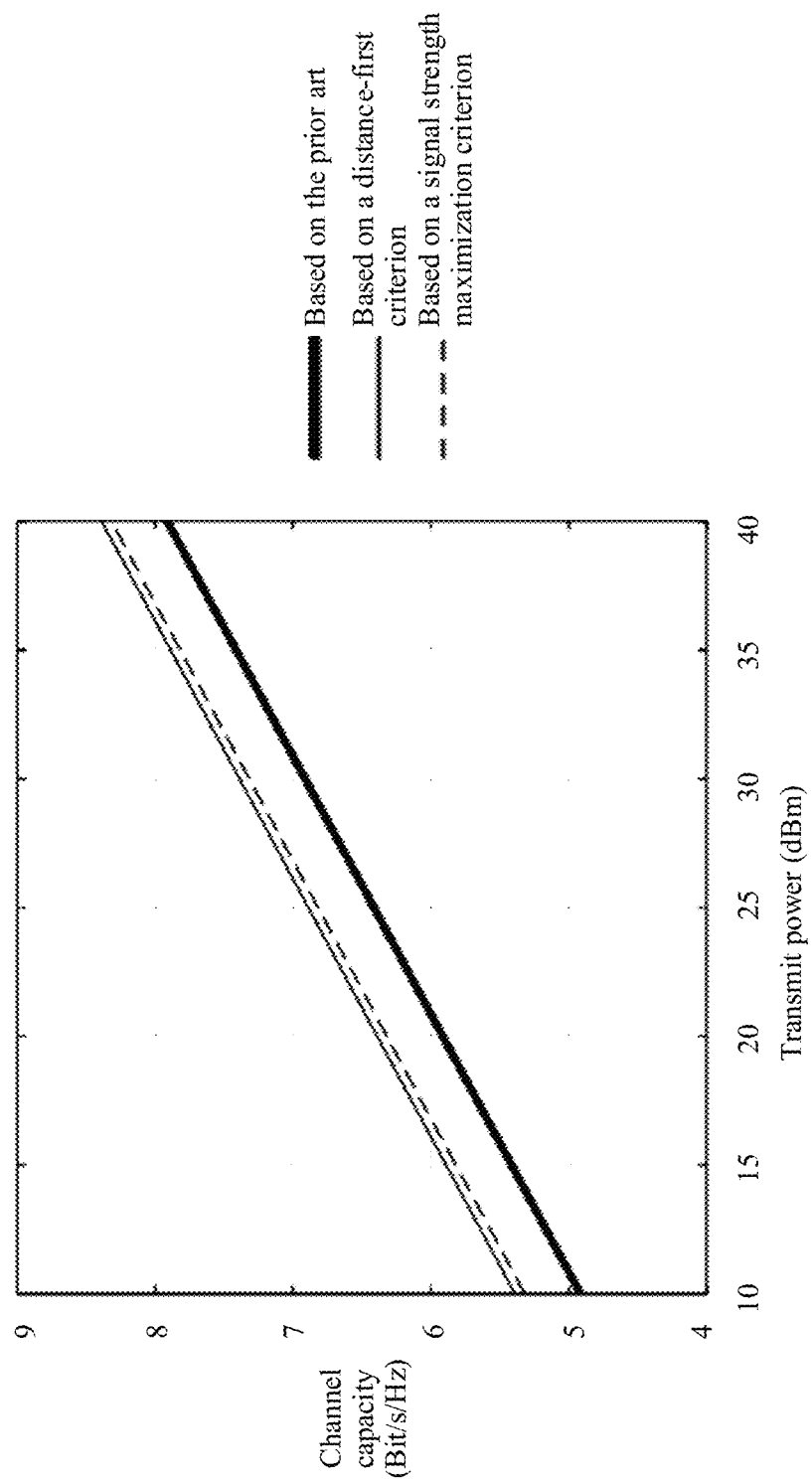
FIG. 5 is a schematic diagram of a comparison between channel capacities according to an embodiment of this application.

Simulation Effect:

(1) Channel capacity comparison: FIG. 5 shows a comparison between a channel capacity when a centralized antenna array in the prior art is used for a base station and a channel capacity when a distributed antenna array in this application is used for a base station. It can be learned that, through the distributed antenna array in this application, a distance from an antenna array used for communication to the terminal is shortened, and the channel capacity can be significantly increased. A channel capacity of the primary antenna array/beam selected according to the distance-first criterion has a small difference from a channel capacity of the primary antenna array/beam selected according to the signal quality RSRP maximization criterion. However, the channel capacities in both the two cases are greater than the channel capacity in the prior art.

(2) Invariance verification of optimal beams: When the primary antenna array is selected based on the foregoing distance-first criterion, optimal beam pairs corresponding to most reference locations are basically fixed.

According the method described in FIG. 2, the plurality of antenna arrays of the base station are dispersedly distributed around the communication area (that is, are distributed antenna arrays). When an obstacle exists between the terminal and the primary antenna array in the plurality of antenna arrays, the terminal performs signal transmission with the secondary antenna array in the plurality of antenna arrays except the primary antenna array, to implement communication between the terminal and the base station, thereby effectively ensuring smooth communication between the terminal and the base station. In addition, correspondences between a plurality of reference locations and a plurality of antenna array groups are further established in advance. In this way, during subsequent switching between antenna arrays, switching between antenna arrays and between beams can be directly performed based on the correspondences, and the antenna arrays and the beams do not need to be retrained, thereby improving efficiency of antenna array and beam switching.

The foregoing describes in detail the method in the embodiments of this application. The following provides apparatuses in the embodiments of this application.

The foregoing mainly describes the solutions provided in the embodiments of this application from a perspective of interaction between the base station and the terminal. It may be understood that, to implement the foregoing functions, the terminal and the base station include corresponding hardware structures and/or software modules for performing the functions. A person skilled in the art should easily be aware that, in combination with the examples described in the embodiments disclosed in this specification, network elements and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal and the base station may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 6:
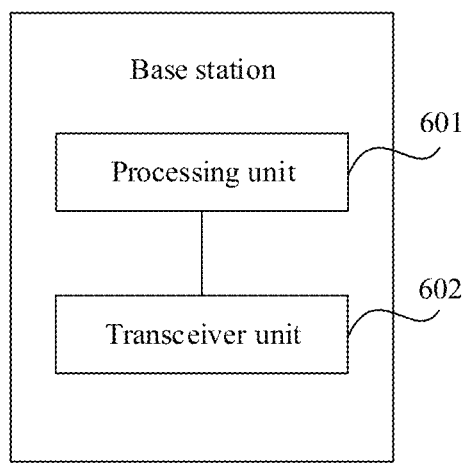
FIG. 6 is a schematic structural diagram of a base station according to an embodiment of this application.

When each functional module is obtained through division based on each corresponding function, FIG. 6 is a possible schematic structural diagram of the base station in the foregoing embodiments. The base station includes a processing unit 601 and a transceiver unit 602. The processing unit 601 is configured to support the terminal in performing other functions, than sending and receiving functions, performed by the terminal in the method embodiments of the terminal, and the transceiver unit 602 is configured to support the terminal in performing steps of receiving information and sending information by the terminal in the method embodiments of the terminal.

With regard to hardware implementation, the processing unit 601 may be a processor, a processing circuit, or the like. The transceiver unit 602 may include a receiver and/or a transmitter, a receiving circuit and/or a transmitting circuit, or the like. In the embodiments of this application, the transceiver unit receives and sends information by using a distributed antenna array, the processing unit 601 and the transceiver unit 602 are connected by using a transceiver, and the processing unit 601 may control the transceiver unit 602, so that the transceiver unit performs corresponding operations.

Figure 7:
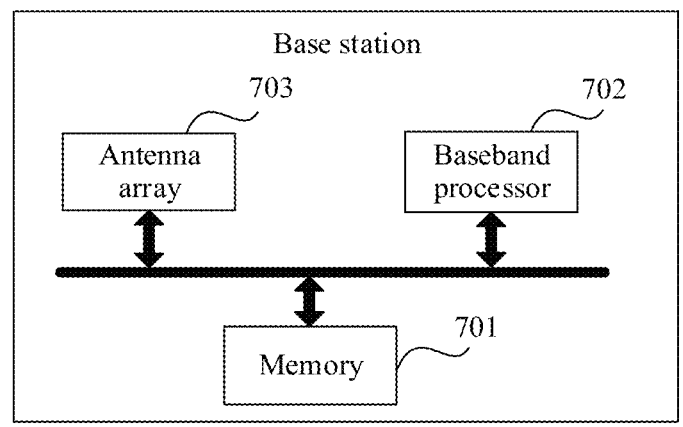
FIG. 7 is a schematic structural diagram of another base station according to an embodiment of this application.

FIG. 7 is a schematic diagram of a possible logical structure of the base station in the foregoing embodiments according to an embodiment of this application. The base station includes a baseband processor 702 and a distributed antenna array 703. In this embodiment of this application, the baseband processor 702 is configured to control and manage an action of the base station. For example, the baseband processor 702 is configured to support the base station in performing an operation of controlling a specific beam of a specific antenna array to perform signal transmission with the terminal in the method embodiments of the base station. The base station may further include a memory 701. The baseband processor 702, the distributed antenna array 703, and the memory 701 may be connected to each other, or may be connected to each other by using a bus 704. The memory 701 is configured to store code and data of the base station. The distributed antenna array 703 is configured to support a location management function network element in performing operations of sending information and receiving information in the embodiment of the location management function network element.

The baseband processor 702 may be a central baseband processor unit, a general-purpose baseband processor, a digital signal baseband processor, an application-specific integrated circuit, a field programmable gate array or another programmable logical device, a transistor logical device, a hardware component, or any combination thereof. The processor may implement or execute various examples of logical blocks, modules, and circuits described with reference to content disclosed in this application. The baseband processor may alternatively be a combination of processors implementing a computing function, for example, a combination including one or more micro baseband processors, or a combination of a digital signal baseband processor and a micro baseband processor.

Figure 8:
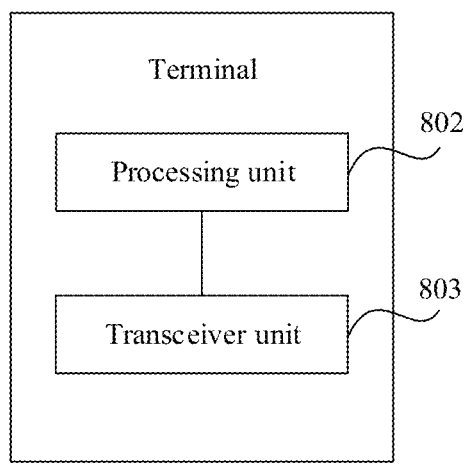
FIG. 8 is a schematic structural diagram of a terminal according to an embodiment of this application.

When each functional module is obtained through division based on each corresponding function, FIG. 8 is a possible schematic structural diagram of the terminal in the foregoing embodiments. The terminal includes a transceiver unit 803 and a processing unit 802. The transceiver unit 803 is configured to support the terminal in performing steps of receiving information and sending information in the method embodiments of the terminal. The processing unit 802 is configured to support the terminal in performing other functions, than a sending function and a receiving function, performed by the terminal in the method embodiments of the terminal.

With regard to hardware implementation, the transceiver unit 803 may include a receiver and/or a transmitter, a receiving circuit and/or a transmitting circuit, or the like. The processing unit 802 may be a processor, a processing circuit, or the like.

Figure 9:
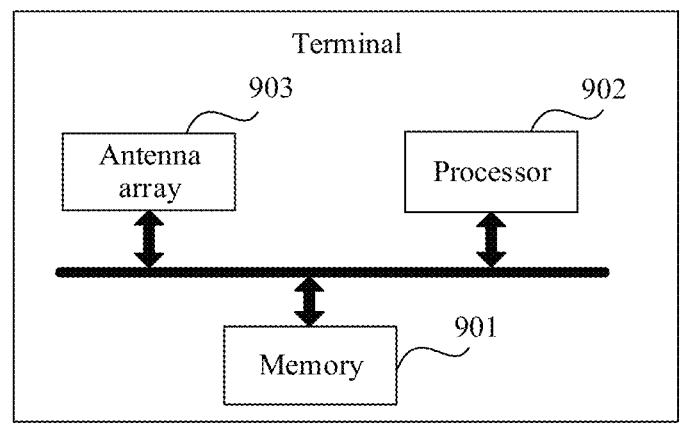
FIG. 9 is a schematic structural diagram of another terminal according to an embodiment of this application.

FIG. 9 is a schematic diagram of a possible logical structure of the terminal in the foregoing embodiments according to an embodiment of this application. The terminal includes a processor 902 and an antenna array 903. In this embodiment of this application, the processor 902 is configured to control and manage an action of the terminal in the embodiments, and the antenna array 903 is configured to support the terminal in performing operations of sending information and receiving information in the embodiments of the terminal. Optionally, the terminal may further include a memory 901. The processor 902, the antenna array 903, and the memory 901 may be connected to each other, or may be connected to each other by using a bus 904. The memory 901 is configured to store program code and data of the terminal.

The processor 902 may be a central processing unit, a general-purpose processor, a digital signal processor, an application-specific integrated circuit, a field programmable gate array or another programmable logical device, a transistor logical device, a hardware component, or any combination thereof. The processor may implement or execute various examples of logical blocks, modules, and circuits described with reference to content disclosed in this application. Alternatively, the processor may be a combination of processors implementing a computing function, for example, a combination of one or more microprocessors, or a combination of a digital signal processor and a microprocessor.

In another embodiment of this application, a readable storage medium is further provided. The readable storage medium stores a computer-executable instruction. A device (which may be a single-chip microcomputer, a chip, or the like) or a processor may invoke the computer-executable instruction stored in the readable storage medium, to perform steps performed by the base station or the terminal in the communication method provided in FIG. 2. The foregoing readable storage medium may include: any medium that can store program code, such as a USB flash drive, a removable hard disk, a read-only memory, a random access memory, a magnetic disk, or an optical disc.

In another embodiment of this application, a computer program product is further provided. The computer program product includes a computer-executable instruction, and the computer-executable instruction is stored in a computer-readable storage medium. At least one processor of a device may read the computer-executable instruction from the computer-readable storage medium, and the at least one processor executes the computer-executable instruction, so that the device performs the steps performed by the terminal or the base station in the communication method provided in FIG. 2.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, wherein the method is applied to a base station, the base station comprises a plurality of antenna arrays and a baseband processing unit, the plurality of antenna arrays are distributed around a communication area and the plurality of antenna arrays are connected to the baseband processing unit, a terminal in the communication area is configured to perform signal transmission with the antenna array to implement communication with the baseband processing unit, and the method comprises:

determining when an obstacle exists between the terminal and a primary antenna array performing signal transmission with the terminal;

controlling, when it is determined that the obstacle exists, by the base station through the baseband processing unit, a secondary antenna array to perform signal transmission with the terminal, wherein the primary antenna array and the secondary antenna array are in the antenna arrays comprised in the base station, and in the plurality of antenna arrays and the secondary antenna array is an antenna array with highest quality of signals between the plurality of antenna arrays and the terminal, wherein when the quality of signals between the primary antenna array and the terminal satisfies $|R_{pmax}-R_{p0}|<\alpha_{th}$, an obstacle exists between the primary antenna array and the terminal, wherein $R_{p0}$ is the quality of signals between the primary antenna array and the terminal, $\alpha_{th}$ is a preset threshold, $R_{pmax}$ is a maximum value of quality of signals between the plurality of antenna arrays and the terminal, and the primary antenna array is any one of the plurality of antenna arrays.

2. The method according to claim 1, wherein before an obstacle appears between the primary antenna array and the terminal, in the plurality of antenna arrays, the primary antenna array is an antenna array closest to the terminal, or the primary antenna array is an antenna array with highest quality of signals between the antenna array and the terminal.

3. The method according to claim 1, wherein the method further comprises:

receiving, by the base station, report information sent by the terminal, and determining a location of the terminal based on the report information;

determining, by the base station based on the location of the terminal, a reference location closest to the location of the terminal;

determining, by the base station based on pre-stored correspondences between a plurality of reference locations and a plurality of antenna array groups, an antenna array group corresponding to the reference location closest to the location of the terminal, wherein each antenna array group comprises the primary antenna array and the secondary antenna array; and sending, by the base station, indication information to the terminal, to indicate the antenna array group corresponding to the reference location closest to the location of the terminal.

4. The method according to claim 1, wherein the method further comprises:

receiving, by the base station, report information sent by the terminal, and determining a location of the terminal based on the report information;

determining, by the base station based on the location of the terminal, a reference location closest to the location of the terminal;

determining, by the base station based on pre-stored correspondences between a plurality of reference locations and a plurality of antenna array groups, an antenna array group corresponding to the reference location closest to the location of the terminal, wherein each antenna array group comprises the primary antenna array and the secondary antenna array; and sending, by the base station, the correspondences between the plurality of reference locations and the plurality of antenna array groups to the terminal, wherein each antenna array group comprises the primary antenna array and the secondary antenna array, and the correspondences are used by the terminal to determine the antenna array group corresponding to the reference location closest to the location of the terminal.

5. The method according to claim 1, wherein the method further comprises:

determining, by the base station, quality of signals between the terminal at a target location in the communication area and each of the plurality of antenna arrays, wherein the target location is any one of the plurality of reference locations;

selecting, by the base station, the antenna array group of the terminal at the target location based on the quality of signals between the terminal at the target location and each of the plurality of antenna arrays; and establishing, by the base station, a correspondence between the target location and the selected antenna array group, to obtain the correspondences between the plurality of reference locations and the plurality of antenna array groups.

6. The method according to claim 1, wherein quality of signals between any antenna array and the terminal comprises signal quality of an optimal beam pair between any antenna array and the terminal, and the optimal beam pair between any antenna array and the terminal is a pair of beams with best signal quality that are formed by a beam generated by any antenna array and a beam generated by the terminal.

7. A communication method, comprising:

determining when an obstacle exists between a terminal and a primary antenna array;

performing, when it is determined that an obstacle exists, by the terminal, signal transmission with a secondary antenna array to implement communication with a base station, wherein the primary antenna array and the secondary antenna array are antenna arrays in a plurality of antenna arrays comprised in the base station, the secondary antenna array is an antenna array with highest quality of signals between the antenna array and the terminal, the plurality of antenna arrays are distributed around a communication area and all connected to a baseband processing unit of the base station, and the terminal is located in the communication area, wherein when the quality of signals between the primary antenna array and the terminal satisfies $|R_{p\ max}-R_{p0}|<\alpha_{th}$, an obstacle exists between the primary antenna array and the terminal, wherein $R_{p0}$ is the quality of signals between the primary antenna array and the terminal, $\alpha_{th}$ is a preset threshold, $R_{p\ max}$ is a maximum value of quality of signals between the plurality of antenna arrays and the terminal, and the primary antenna array is any one of the plurality of antenna arrays.

8. The method according to claim 7, wherein before an obstacle appears between the primary antenna array and the terminal, in the plurality of antenna arrays, the primary antenna array is an antenna array closest to the terminal, or the primary antenna array is an antenna array with highest quality of signals between the antenna array and the terminal.

9. The method according to claim 7, wherein the method further comprises:
   receiving, by the terminal, correspondences that are sent by the base station and that are between a plurality of reference locations and a plurality of antenna array groups, wherein each of the antenna array groups comprises the primary antenna array and the secondary antenna array;
   determining, by the terminal based on a location of the terminal, a reference location closest to the location of the terminal; and
   determining, by the terminal based on the correspondences between the plurality of reference locations and the plurality of antenna array groups, an antenna array group corresponding to the reference location closest to the location the terminal.

10. The method according to claim 7, wherein the method further comprises:
    sending, by the terminal, report information to the base station to report a location of the terminal, so that the terminal determines, based on pre-stored correspondences between a plurality of reference locations and a plurality of antenna array groups, an antenna array group corresponding to a reference location closest to the location of the terminal, wherein each of the antenna array groups comprises the primary antenna array and the secondary antenna array;
    receiving, by the terminal, indication information sent by the base station; and
    determining, by the terminal based on the indication information, the antenna array group corresponding to the reference location closest to the location of the terminal.

11. The method according to claim 7, wherein quality of signals between any antenna array and the terminal comprises signal quality of an optimal beam pair between any antenna array and the terminal, and the optimal beam pair between any antenna array and the terminal is a pair of beams with best signal quality that are formed by a beam generated by any antenna array and a beam generated by the terminal.

12. A base station comprising:
    a plurality of antenna arrays; and
    a baseband processing unit, wherein the plurality of antenna arrays are distributed around a communication area and are all connected to the baseband processing unit, and a terminal in the communication area is configured to perform signal transmission with the antenna array to implement communication with the baseband processing unit; and the baseband processing unit is configured to:
       determine when an obstacle exists between the terminal and a primary antenna array performing signal transmission with the terminal;
       control, when it is determined that the obstacle exists, a secondary antenna array to perform signal transmission with the terminal, wherein the primary antenna array and the secondary antenna array are in the antenna arrays comprised in the base station, and the secondary antenna array is an antenna array with highest quality of signals between the antenna array and the terminal, wherein when the quality of signals between the primary antenna array and the terminal satisfies $|R_{p\ max}-R_{p0}|<\alpha_{th}$, an obstacle exists between the primary antenna array and the terminal, wherein $R_{p0}$ is the quality of signals between the primary antenna array and the terminal, $\alpha_{th}$ is a preset threshold, $R_{p\ max}$ is a maximum value of quality of signals between the plurality of antenna arrays and the terminal, and the primary antenna array is any one of the plurality of antenna arrays.

13. The base station according to claim 12, wherein before an obstacle appears between the primary antenna array and the terminal, in the plurality of antenna arrays, the primary antenna array is an antenna array closest to the terminal, or the primary antenna array is an antenna array with highest quality of signals between the antenna array and the terminal.

14. The base station according to claim 12, wherein the baseband processor is further configured to:
    receive report information sent by the terminal, and determine a location of the terminal based on the report information;
    determine, based on the location of the terminal, a reference location closest to the location of the terminal;
    determine, based on pre-stored correspondences between a plurality of reference locations and a plurality of antenna array groups, an antenna array group corresponding to the reference location closest to the location of the terminal, wherein each antenna array group comprises the primary antenna array and the secondary antenna array; and
    send indication information to the terminal, to indicate the antenna array group corresponding to the reference location closest to the location of the terminal.

15. The base station according to claim 12, wherein the baseband processor is further configured to:
    receive report information sent by the terminal, and determine a location of the terminal based on the report information;
    determine, based on the location of the terminal, a reference location closest to the location of the terminal;
    determine, based on pre-stored correspondences between a plurality of reference locations and a plurality of antenna array groups, an antenna array group corresponding to the reference location closest to the location of the terminal, wherein each antenna array group comprises the primary antenna array and the secondary antenna array; and
    send the correspondences between the plurality of reference locations and the plurality of antenna array groups to the terminal, wherein each antenna array group comprises the primary antenna array and the secondary antenna array, and the correspondences are used by the terminal to determine the antenna array group corresponding to the reference location closest to the location of the terminal.

16. The base station according to claim 12, wherein the baseband processing unit is further configured to:

determine quality of signals between the terminal at a target location in the communication area and each of the plurality of antenna arrays, wherein the target location is any one of the plurality of reference locations;

select the antenna array group of the terminal at the target location based on the quality of signals between the terminal at the target location and each of the plurality of antenna arrays; and establish a correspondence between the target location and the selected antenna array group, to obtain the correspondences between the plurality of reference locations and the plurality of antenna array groups.

17. The base station according to claim 12, wherein quality of signals between any antenna array and the terminal comprises signal quality of an optimal beam pair between any antenna array and the terminal, and the optimal beam pair between any antenna array and the terminal is a pair of beams with best signal quality that are formed by a beam generated by any antenna array and a beam generated by the terminal.

* * * * *

UNITED STATES PATENT AND TRADEMARK OFFICE
CERTIFICATE OF CORRECTION

PATENT NO. : 11,303,334 B2  
APPLICATION NO. : 17/039345  
DATED : April 12, 2022  
INVENTOR(S) : Liu et al.

Page 1 of 1

It is certified that error appears in the above-identified patent and that said Letters Patent is hereby corrected as shown below:

In the Claims

Claim 7: Column 21, Lines 1-2: "mary antenna array and the terminal satisfies $|R_{p\,max} - R_{p0}| < \alpha_{th}$, an obstacle exists between the primary" should read -- mary antenna array and the terminal satisfies $|R_{pmax} - R_{p0}| < \alpha_{th}$, an obstacle exists between the primary --.

Claim 7: Column 21, Line 5: "array and the terminal, $\alpha_{th}$ is a preset threshold, $R_{p\,max}$" should read -- array and the terminal, $\alpha_{th}$ is a preset threshold, $R_{pmax}$ --.

Claim 12: Column 22, Line 15: "satisfies $|R_{p\,max} - R_{p0}| < \alpha_{th}$, an obstacle exists" should read -- satisfies $|R_{pmax} - R_{p0}| < \alpha_{th}$, an obstacle exists --.

Claim 12: Column 22, Line 19: "array and the terminal, $\alpha_{th}$ is a preset threshold, $R_{p\,max}$" should read -- array and the terminal, $\alpha_{th}$ is a preset threshold, $R_{pmax}$ --.

Signed and Sealed this  
Ninth Day of August, 2022

Katherine Kelly Vidal  
*Director of the United States Patent and Trademark Office*